(12) United States Patent
Tanose et al.

(10) Patent No.: US 7,352,419 B2
(45) Date of Patent: Apr. 1, 2008

(54) LIQUID CRYSTAL DISPLAY HAVING A CONTROL FACTOR FOR REDUCING A CHROMATICITY DIFFERENCE BETWEEN DISPLAYED WHITE AND DISPLAYED BLACK

(75) Inventors: Tomonori Tanose, Kawasaki (JP); Manabu Sawasaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/842,893

(22) Filed: May 11, 2004

(65) Prior Publication Data

US 2005/0128381 A1  Jun. 16, 2005

(30) Foreign Application Priority Data

Dec. 10, 2003  (JP) .............................. 2003-411398

(51) Int. Cl.
*G02F 1/1335* (2006.01)
(52) U.S. Cl. .................................................. 349/106
(58) Field of Classification Search ........ 349/106–107, 349/129–130
See application file for complete search history.

(56) References Cited

U.S. PATENT DOCUMENTS

| | | | |
|---|---|---|---|
| 4,632,514 A | 12/1986 | Ogawa et al. ............... 349/107 |
| 5,982,465 A * | 11/1999 | Saxena et al. ............... 349/119 |
| 6,147,728 A * | 11/2000 | Okumura et al. ............ 349/106 |
| 6,259,503 B1 * | 7/2001 | Watanabe et al. ............ 349/141 |
| 6,671,025 B1 * | 12/2003 | Ikeda et al. .................. 349/156 |
| 6,836,308 B2 * | 12/2004 | Sawasaki et al. ............ 349/129 |
| 6,906,765 B2 * | 6/2005 | Narutaki et al. ............. 349/106 |
| 2005/0128371 A1 * | 6/2005 | Ueda et al. .................... 349/33 |

FOREIGN PATENT DOCUMENTS

| | | |
|---|---|---|
| EP | 0152827 A2 | 8/1985 |
| JP | S60-159823 | 8/1985 |
| JP | H05-181129 | 7/1993 |
| JP | 08-043621 | 2/1996 |
| JP | H09-005736 | 1/1997 |
| JP | 2001-194658 * | 7/2001 |

* cited by examiner

*Primary Examiner*—Toan Ton
(74) *Attorney, Agent, or Firm*—Greer, Burns & Crain, Ltd.

(57) ABSTRACT

In order to suppress color tint during display of black, chromaticity is changed when black is displayed while maintaining chromaticity when white is displayed. For this purpose, the pigment to be dispersed in a color resist is adjusted in particle size and concentration. Such adjustment is so performed that the chromaticity difference between displayed white and black becomes 0.01 or smaller in the x-y chromaticity coordinates by varying the transmissivity of color pixels during display of black. With such a structure, successfully provided is a color liquid crystal display capable of preventing color tint in displayed black, while keeping white chromaticity at the desired level.

13 Claims, 6 Drawing Sheets

| LIQUID CRYSTAL DISPLAY | MATERIAL CONTRAST VALUE OF GREEN-COLORED RESIN | WHITENESS | | BLACKNESS | | CHROMATICITY DIFFERENCE BETWEEN DISPLAYED WHITE AND BLACK | |
|---|---|---|---|---|---|---|---|
| | | WTx | WTy | BKx | BKy | Δx | Δy |
| SAMPLE A | 1100 | 0.312 | 0.340 | 0.305 | 0.382 | 0.007 | -0.042 |
| SAMPLE B | 1900 | 0.312 | 0.340 | 0.311 | 0.344 | 0.001 | -0.004 |
| CHROMATICITY DIFFERENCE BETWEEN B AND A | | 0.000 | 0.000 | 0.006 | -0.038 | | |
| RATIO OF MATERIAL CONTRAST VALUE (B/A) | 1.73 | | | | | | |

LIQUID CRYSTAL DISPLAY HAVING A CONTROL FACTOR FOR REDUCING A CHROMATICITY DIFFERENCE BETWEEN DISPLAYED WHITE AND DISPLAYED BLACK

BACKGROUND OF THE INVENTION

1. Field of the Invention

The present invention relates to a liquid crystal display capable of color display for use in a display section of an information appliance and others.

2. Description of the Related Art

A liquid crystal display is provided with a pair of substrates each having a transparent electrode on the sides facing each other, and a liquid crystal layer sealed between these substrates. Through voltage applied between the transparent electrodes, the liquid crystal display drives the liquid crystal to control the light transmissivity of the liquid crystal on a pixel basis. In recent years, the liquid crystal display is used as a display section for a notebook PC, a television receiver, a display monitor, a PDA (Personal Digital Assistant), a projection projector, and others. The demand for the liquid crystal display has been increasing, accompanied with higher expectations therefor. Especially, improvement of the display quality is demanded.

For improvement of the display quality, chromaticity adjustment is a possible method. The liquid crystal display of a general type capable of color display optimizes the chromaticity during display of white (whiteness). Such optimization is done through adjustment of spectrum distribution of light beams emitted from a light source such as a backlight unit, or through adjustment of chromatic balance of color filters (CF) provided for pixels of red (R), green (G) and blue (B).

The issue here is that even if whiteness is optimized though such adjustment, it does not necessarily optimize chromaticity during display of black (blackness). It is often considered desirable if black chromaticity matches white chromaticity. However, merely adjusting whiteness does not achieve such match between blackness and whiteness, causing color level difference (chromatic deviation). An adjustment optimizing blackness while keeping whiteness at its optimum level is extremely difficult.

If there is any color level difference, a color-tint phenomenon occurs during display of black. The causes for such a color-tint phenomenon are varying in type, e.g., spectrum distribution of illumination light, dependence of retardation of the liquid crystal layer on wavelength, color level balance of color filters provided for every color pixel, material contrast value expressing the depolarization property of the colored resin (color resist) forming the color filter and structural property of polarization plates and panels.

For example, if any slight light leakage is found during display of black due to the dependence of retardation of the liquid crystal layer on wavelength, a color-tint phenomenon occurs by reason of color level difference. That is, if blackness shows a bias toward blue with respect to whiteness, black display is tinted blue. If this is the case, an exemplary solution may be the multigap structure in which the cell gap thickness of a blue pixel region is made different from the cell gap thickness of red and green pixel regions to reduce the color-tint level to some degree. The problem of such a multigap structure is that if blackness shows a bias toward green or red with respect to whiteness, the color tint cannot be reduced sufficiently.

Moreover, even if any desired whiteness is derived through adjustment of the color level balance of the color filters provided for every color pixel, and even if the color resists are provided with the same material contrast value, the color level during display of black may not be the desired level due to color-tinting caused by the polarization plate, color-tinting caused by the liquid crystal molecule alignment, or other reasons. What is worse, depending on the panel structure, some specific color pixel region may suffer from liquid crystal molecule misalignment. As a result, in such a color pixel region, the transmissivity is increased during display of black, thereby causing color-tint.

As such, the larger color level difference causes color-tint during display of black, and this is a cause of considerably lowering the display quality as the liquid crystal display.

[Patent Document 1] JP-A-9-005736

SUMMARY OF THE INVENTION

Therefore, an object of the present invention is to provide a liquid crystal display capable of preventing a color-tint phenomenon occurring during display of black while keeping whiteness at its any desired level.

The above object is achieved by a liquid crystal display including: a plurality of color pixels formed on a substrate; an opposing substrate placed on an opposite side of the substrate; a liquid crystal sealed between the substrate and the opposite substrate; and a control factor for reducing the color level difference between chromaticity during display of black and chromaticity during display of white, by varying transmissivity on a color pixel basis.

According to the present invention, realized is a liquid crystal display capable of preventing a color-tint phenomenon occurring during display of black while keeping whiteness at any desired level.

DESCRIPTION OF THE PREFERRED EMBODIMENTS

First Embodiment

Figure 1:
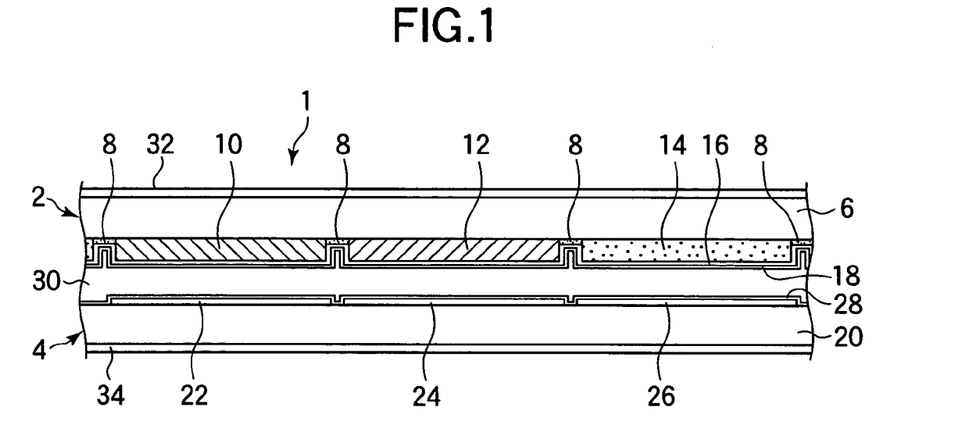
FIG. 1 is a diagram showing a cross-section structure of a liquid crystal display 1 according to a first embodiment of the present invention when it is vertically cut with respect to an image display surface.
Figure 2A:
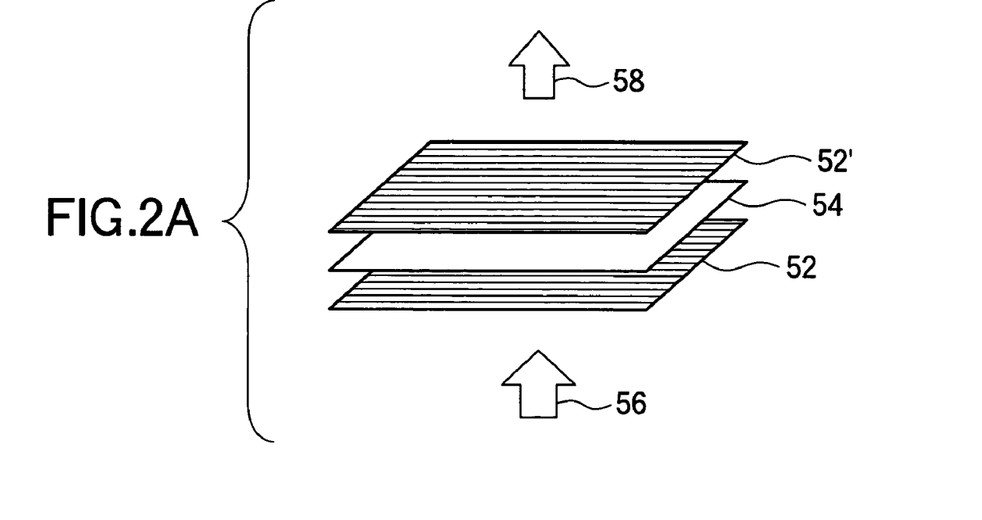
FIGS. 2A and 2B are both a diagram showing the chromaticity measurement result of the liquid crystal display 1 of the first embodiment derived by changing a material contrast value of a green pixel 12.
Figure 2B:
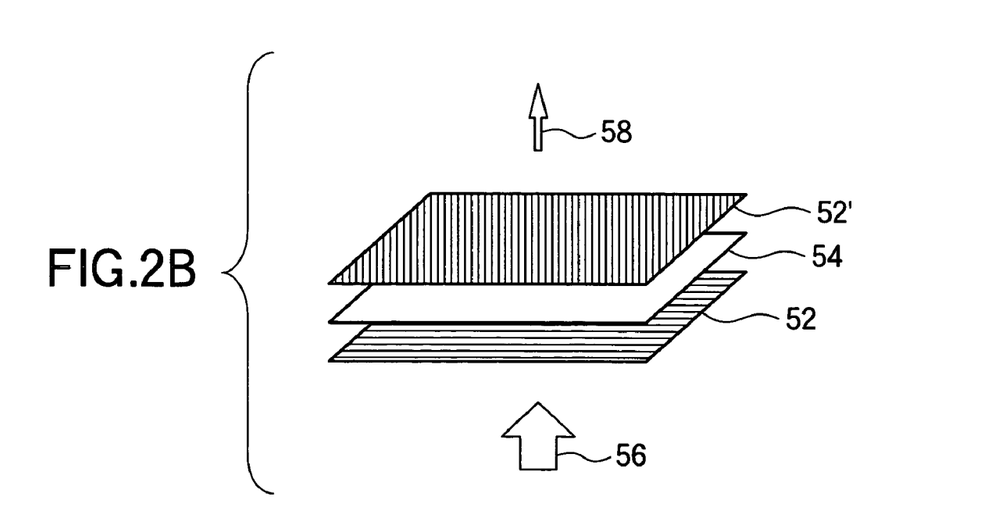
Figure 3:
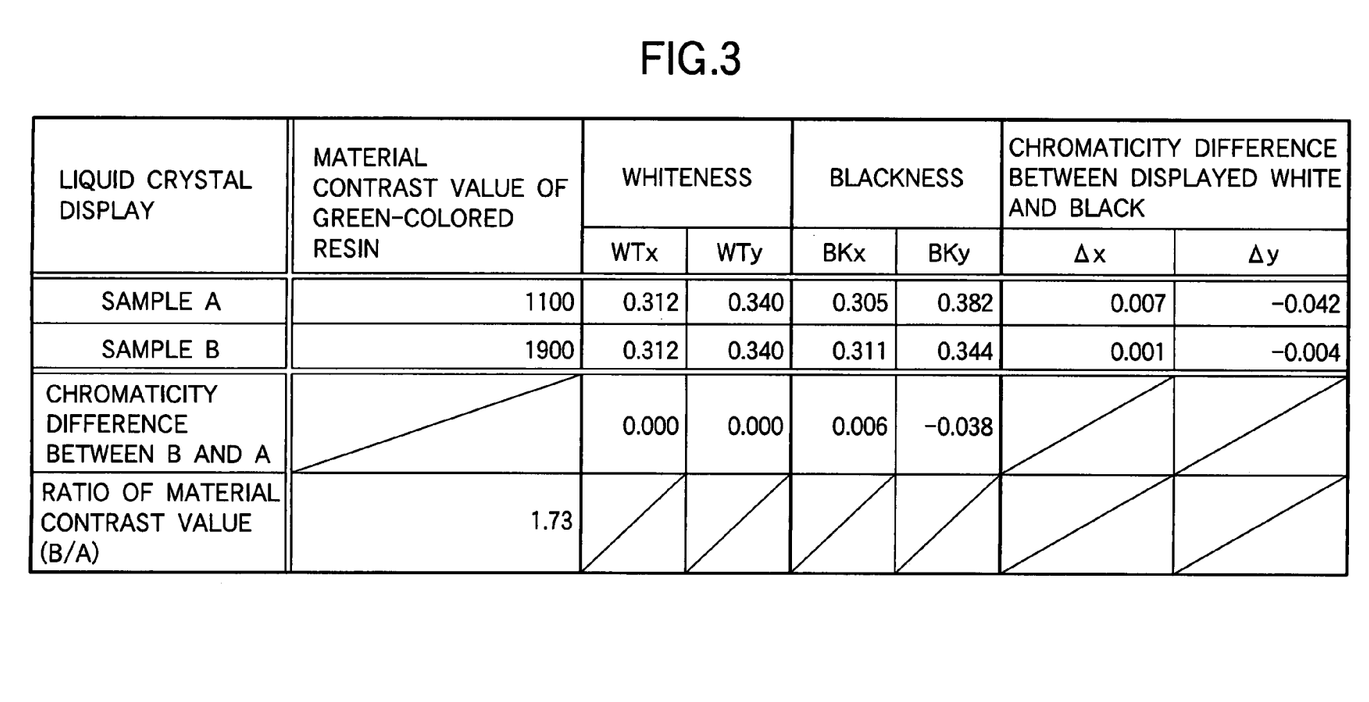
FIG. 3 is a diagram showing the method of measuring a material contrast value CR.

A liquid crystal display according to a first embodiment of the present invention is described by referring to FIG. 1 to 3. The present embodiment is characterized in that, in the liquid crystal display, the color level difference between whiteness and blackness is reduced by adjusting blackness through control of transmissivity during display of black on a color pixel basis. In an exemplary case where blackness shows a bias toward red with respect to whiteness, i.e., in x-y chromaticity coordinates, the x coordinate value for blackness is larger than that for whiteness, reducing the transmissivity of a red pixel is a possibility during display of black. Alternatively, the x coordinate value for blackness may be reduced by increasing the transmissivity for green and blue pixels during display of black to bring blackness closer in level to whiteness. If this is the case, because such transmissivity reduction is applied only during display of black, the influence on whiteness can be extremely reduced, and thus whiteness shows almost no change. In such a manner, the liquid crystal display can be improved in display quality.

By referring to FIG. 1, the schematic structure of a liquid crystal display 1 of the present embodiment is described. FIG. 1 shows the cross-section structure of the liquid crystal display 1 of the present embodiment when it is vertically cut with respect to the image display surface. As shown in FIG. 1, the liquid crystal display 1 is provided with a color filter (CF) substrate 2, and an array substrate 4 that is so placed as to face the CF substrate 2. The CF substrate 2 includes a glass substrate 6, on which a light-shielding film (BM) 8 is formed to protect boundary regions of color pixels from light. The BM 8 is a chrome (Cr) film having a film thickness of 150 nm, for example. Above the glass substrate 6 and between the BM's 8, red pixel regions are provided that include a red (R) pixel 10 which is a red colored resin of the scattered pigment type (red color resist) that is formed to be 2 μm in film thickness. A green pixel region adjacent to the red pixel 10 includes a green (G) pixel 12 which is a green colored resin of the scattered pigment type (green color resist) that is formed to be 2 μm in film thickness. Also, a blue pixel region adjacent to the green pixel 12 includes a blue (B) pixel 14 which is a blue colored resin of the scattered pigment type (blue color resist) that is formed to be 2 μm in film thickness.

In the liquid crystal display 1, the color resists of the color pixels 10, 12 and 14 are each provided with a control factor controlling the material contrast value CR so as to make possible reduction of the color level difference between whiteness and blackness. Although the details will be described later by referring to the accompanying drawings, the material contrast value CR is the reference value for changing the transmissivity during display of black so as to suppress color-tinting for the duration.

A set including the red pixel 10, green pixel 12 and blue pixel 14 structures adjacent to each other comprises one display pixel, and arranging the display pixels in a matrix forms an image display region. All over the image display region, i.e., over the red, green, and blue pixels 10, 12, and 14, and the BM 8, a common electrode 16 is formed. The common electrode 16 is a film of thickness 150 nm, made of a transparent conductive material such as ITO (Indium Tin Oxide) with sputtering, for example. On such a common electrode 16, an alignment film 18 is formed.

The array substrate 4 facing the CF substrate 2 includes a glass substrate 20. Over the glass substrate 20, is a pixel electrode comprising a film of thickness 150 nm, made of a transparent conductive material such as ITO and formed by sputtering, for example. In FIG. 1, the red pixel 10 is formed with a pixel electrode 22, the green pixel 12 is formed with a pixel electrode 24, and the blue pixel 14 is formed with a pixel electrode 26. On these pixel electrodes, an alignment film 28 is formed. Further, although not shown, on the glass substrate 20 facing the BM 8, a plurality of thin film transistors (TFTs), a plurality of gate bus lines, and a plurality of data bus lines are formed.

Between the CF substrate 2 and the array substrate 4, a liquid crystal layer 30 is sealed in. A polarization plate 32 is attached to the surface opposed to a counter surface of the CF substrate 2 facing the array substrate 4. A polarization plate 34 is attached to the surface opposed to a counter surface of the array substrate 4 facing the CF substrate 2. The polarization plates 32 and 34 are arranged in cross nicol.

In the liquid crystal display 1 in such a structure, the color pixels 10, 12 and 14 are each provided with a material contrast value CR of the corresponding color resist used as a reference value to adjust the transmissivity during display of black so as to suppress color-tinting for the duration.

FIGS. 2A and 2B both show the method of measuring such a material contrast value CR each provided for the color resists. Specifically, FIG. 2A shows a sample derived by attaching, in parallel nicol, polarization plates 52 and 52' onto the front and back surfaces of a color filter substrate 54, respectively. Herein, the color filter substrate 54 is the one formed by coating a color resist of a predetermined color on a glass substrate to have a predetermined film thickness. Thus derived sample is exposed to a light beam 56 of a predetermined light quantity from the polarization plate 52 side, and then a transmitted light beam 58 emitted from the polarization plate 52' side is measured for its light quantity. Thereafter, a transmissivity Tp is calculated as a ratio of the transmitted light quantity to the originally-exposed light quantity. FIG. 2B shows a sample derived by attaching, in cross nicol, the polarization plates 52 and 52' onto the front and back surfaces of the color filter substrate 54, respectively. This sample's transmissivity Tc is calculated in the same manner as above.

The material contrast value is here referred to as CR, and has the following relation with tranmissivity:

$$CR=Tp/Tc \qquad \text{(Equation 1)}.$$

The material contrast value CR can be adjusted by changing the pigment type dispersed in the resists. In an exemplary case of increasing the material contrast value CR of a color resist, a pigment is used that has high tinting strength and is small in particle size, to reduce the pigment concentration in the color resist. This accordingly reduces light scattering and refraction in the color pixel, leading to the lower transmissivity Tc. As a result, the material contrast value CR expressed by Equation 1 is increased. On the other hand, if the pigment concentration in the color resist is increased by using a pigment that has low tinting strength and large in particle size, light scattering and refraction in the color pixel is great. Thus, the transmissivity Tc is increased, and the material contrast value CR expressed by Equation 1 is decreased.

As an example, considered is the case where the transmissivity of the green pixel 12 during display of black is higher than the transmissivity of the red and blue pixels 10 and 14 during display of black. In such a case, blackness shows a bias toward green, and black display is thus tinted green. A solution is to increase the transmissivity of the red and blue pixels 10 and 14 during display of black, or to optimize the transmissivity balance among the red, green and blue pixels 10, 12 and 14 through reduction of the transmissivity of the green pixel 12. Then, a pigment that has high tinting strength and small in particle size is used for a green color resist to reduce the pigment concentration therein. In this manner, the material contrast value CR is increased for the color resist to be used for the green pixel 12, so that the transmissivity of the green pixel 12 can be reduced during display of black.

FIG. 3 shows the chromaticity measurement result of the liquid crystal display 1 derived by changing the material contrast value CR of the green pixel 12. In FIG. 3, sample A is the green pixel 12 of the liquid crystal display 1 prior to adjustment of blackness, and measurement results of the material contrast value, whiteness and blackness are given. A sample B is the green pixel 12 of the liquid crystal display 1 after adjustment of blackness, and measurement results of the material contrast value, whiteness and blackness are given. In the sample A, to derive white chromaticity (WTx, WTy) of (0.312, 0.340) in the x-y chromaticity coordinates, adjustment is accordingly applied in such a manner as to equalize the material contrast value CR (CR=1100) among RGB colors. When black is displayed in the liquid crystal display 1 in the case of sample A, blackness (BKx, BKy) becomes (0.305, 0.382). Accordingly, the color level difference ($\Delta x$, $\Delta y$) between whiteness and blackness will be (0.007, −0.042). Close studies have been conducted about the color level difference ($\Delta x$, $\Delta y$) of a range with which color-tinting during display of black is negligible. The study result tells it is preferable if the absolute value of the color level difference ($|\Delta x|$, $|\Delta y|$) is in a range of $|\Delta x \oplus \leq 0.01$, and $|\Delta y| \leq 0.01$. Based on this standard, with the liquid crystal display 1 of the sample A, it follows that the color difference $\Delta y$ of the y coordinate is out of the preferable range.

Therefore, in order to bring blackness closer in level to whiteness by reducing the transmissivity of the green pixel 12 during display of black, the material contrast value CR of the green pixel 12 is increased as described above. At this time, if the material contrast value CR of the color resist used for the green pixel 12 is set to be 1.5 times or more of the material contrast value CR of the color resists used for the red and blue pixels 10 and 14, color-tinting during display of black can be effectively reduced in level. The material contrast value CR of the color resist used for the green pixel 12 is 1.73 times (CR=1900) of that of the sample A. In the sample B, blackness (BKx, BKy) is (0.311, 0.344), which is different from that in the sample A, but whiteness (WTx, WTy) of the sample B is (0.312, 0.340), which is the same as that in the sample A. Accordingly, the color level difference ($\Delta x$, $\Delta y$) between whiteness and blackness in the sample B is (0.001, −0.004), and the absolute value of the color level difference ($|\Delta x|$, $|\Delta y|$) is in the preferable range of $|\Delta x| \leq 0.01$, and $|\Delta y| \leq 0.01$.

As such, by using a pigment that has high tinting strength and small in particle size to reduce the pigment concentration in the color resist, the material contrast value CR of the color resist can be increased. Accordingly, without exerting any influence on whiteness, it becomes possible to change only blackness.

In the above example, adjustment is applied to the tinting strength and particle size of a pigment to be dispersed into the resin material. The invention is not restricted to this, and the material contrast value CR of the color resist may be adjusted by regulating the stirring time (time taken for stirring of pigment and base material together) in a process of dispersing the pigment of the color resist, or by increasing the pigment concentration through addition of a non-tinted pigment.

According to the present embodiment, the color level difference between whiteness and blackness can be reduced to an extremely small level through adjustment of the material contrast value CR of the color resist used for the red, green and blue pixels 10, 12 and 14, thus controlling the transmissivity during display of black on an individual color pixel basis. Moreover, influence exerted thereby on whiteness can be greatly limited, and thus whiteness of any desired level can be retained. Accordingly, the liquid crystal display 1 can be favorably improved in display quality.

Second Embodiment

Figure 4A:
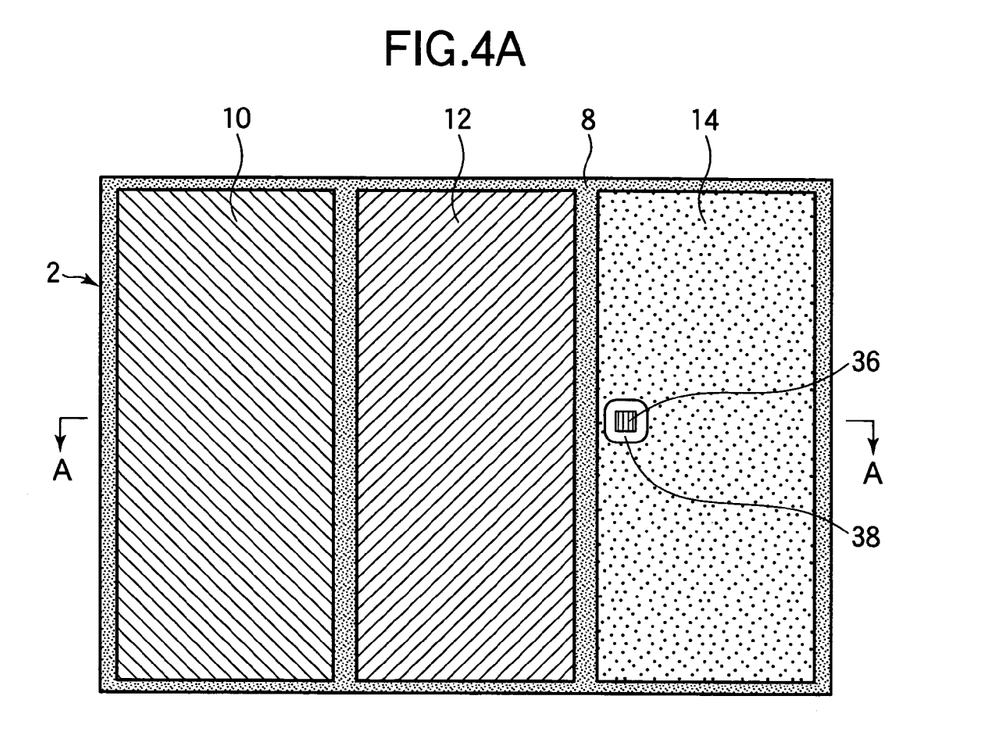
FIGS. 4A and 4B are both a diagram showing the schematic structure of color pixels (red pixel 10, green pixel 12 and blue pixel 14) in the liquid crystal display 1 of a second embodiment.
Figure 4B:
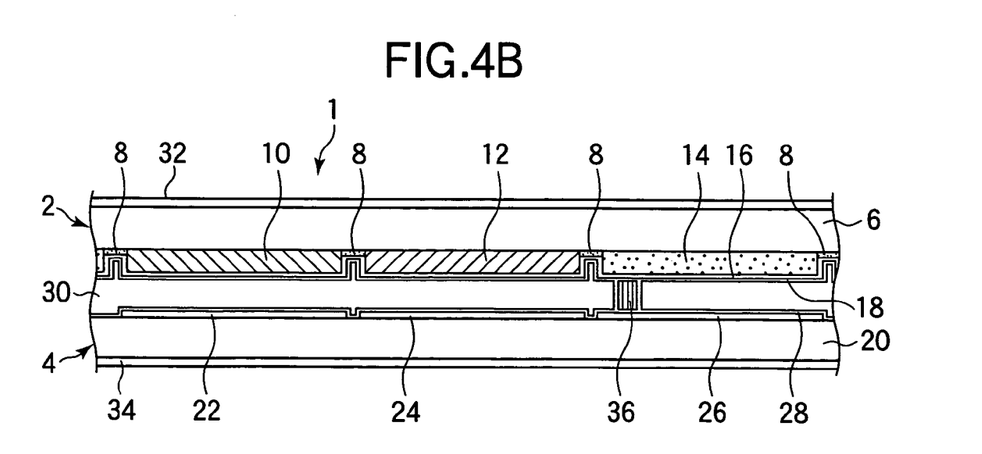

By referring to FIGS. 4A and 4B, a liquid crystal display according to a second embodiment of the present invention is described. FIGS. 4A and 4B both show the schematic structure of color pixels (red pixel 10, green pixel 12, and blue pixel 14) in the liquid crystal display 1 of the present embodiment. Specifically, FIG. 4A shows the color pixels viewed from the image display surface of the CF substrate 2, and FIG. 4B shows the cross-section structure cut along a line A-A of FIG. 4A. Herein, any component identical in operation and function as that of the liquid crystal display 1 of FIG. 1 of the first embodiment is provided with the same reference numeral, and not described again.

As shown in FIGS. 4A and 4B, the liquid crystal display 1 is characterized in that a resin protrusion 36 is provided on the blue pixel 14 as a control factor for reducing the color level difference between whiteness and blackness. The resin protrusion 36 is partially a pillar resin spacer that is formed to maintain a cell gap. The resin protrusion 36 is formed using a photosensitive novolac resin or acrylic resin, for example, to have a film thickness (height) of 4.0 μm. The resin protrusion 36 is formed to the color pixel whose transmissivity is to be increased during display of black. For example, when blackness shows a bias toward red, the plurality of resin protrusions 36 are so formed as to be partially or entirely placed on the blue pixels 14. Thereby, in the vicinity of the resin protrusion 36 thus formed on the blue pixel 14, generated is a misalignment region 38 in which the liquid crystal molecules (not shown) of the liquid crystal layer 30 show an irregular alignment. Any light leakage from such a misalignment region 38 during display of black will increase the transmissivity of the blue pixel 14. Accordingly, blackness that had a bias toward red will shift toward blue, so that the chromaticity of the displayed black can be brought closer to that of the displayed white. Further, because the blue pixel 14 entirely allows light beams to pass through during display of white, the resin protrusion 36 and the misalignment region 38 exert extremely little influence. Thus, whiteness can be kept at any desired level.

As such, in the present embodiment, the transmissivity during display of black can be controlled on a color pixel basis by forming the resin protrusion 36 to any specific color pixel to generate the misalignment region 38. With such a structure, the color level difference between whiteness and blackness can be reduced to an extreme level. What is more, the whiteness can be extremely slight, and thus whiteness of any desired level can be retained. Accordingly, the liquid crystal display 1 can be favorably improved in display quality.

Third Embodiment

Figure 5A:
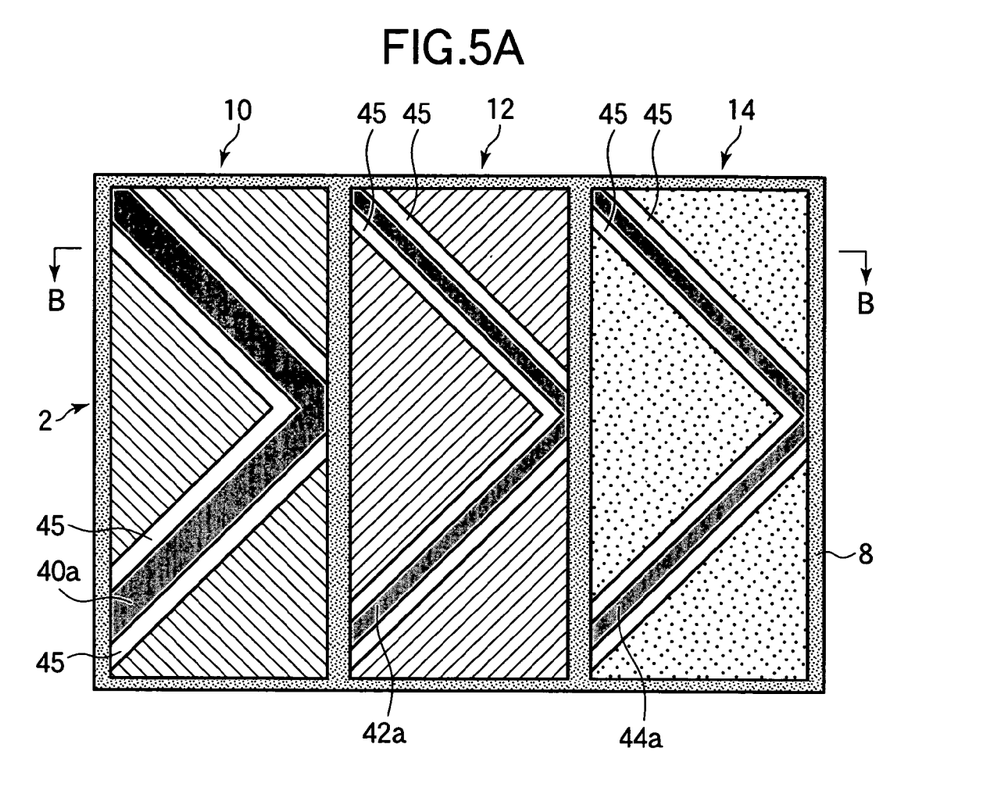
FIGS. 5A and 5B are both a diagram showing the schematic structure of the color pixels (red pixel 10, green pixel 12 and blue pixel 14) in the liquid crystal display 1 of a third embodiment.
Figure 5B:
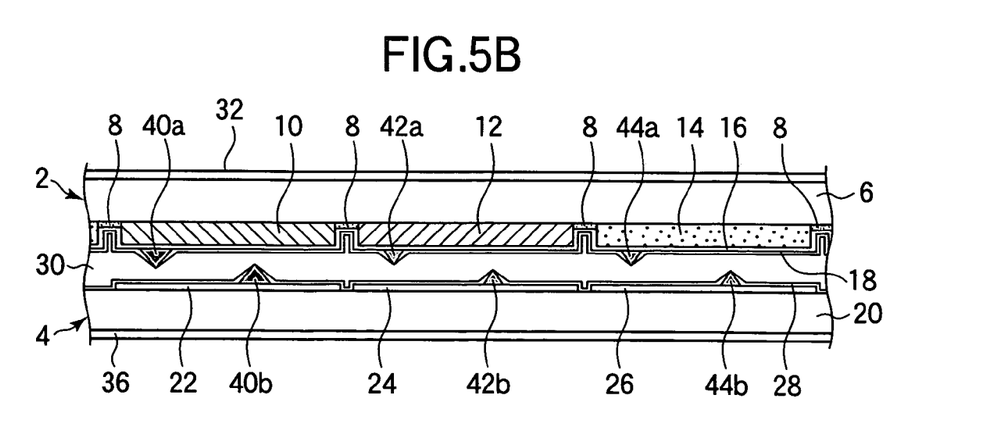

By referring to FIGS. 5A and 5B, a liquid crystal display according to a third embodiment of the present invention is described. FIGS. 5A and 5B both show the schematic structure of color pixels (red pixel 10, green pixel 12 and blue pixel 14) in the liquid crystal display 1 of the present embodiment. Specifically, FIG. 5A shows the CF substrate 2 viewed from the image display surface, and FIG. 5B shows the cross-section structure cut along a line B-B of FIG. 5A.

Herein, any component identical in operation and function as that of the liquid crystal display 1 of FIG. 1 of the first embodiment is provided with the same reference numeral, and not described again.

As shown in FIGS. 5A and 5B, the liquid crystal display 1 is characterized in that control factors for reducing the color level difference between whiteness and blackness are alignment control protrusions 40a, 40b, 42a, 42b, 44a and 44b. These alignment control protrusions 40a to 44b are all provided for alignment control of the vertical-aligning liquid crystal molecules with negative dielectric anisotropy, and formed to have a film thickness (height) of 2.0 μm using a photosensitive novolac resin or acrylic resin, for example. The alignment control protrusion 40a is formed on the red pixel 10, and the alignment control protrusion 40b is formed on the pixel electrode 22. The alignment control protrusion 42a is formed on the green pixel 12, and the alignment control protrusion 42b is formed on the pixel electrode 24. The alignment control protrusion 44a is formed on the blue pixel 14, and the alignment control protrusion 44b is formed on the pixel electrode 26.

The two specific alignment control protrusions 40a and 40b, 42a and 42b, or 44a and 44b formed on the color pixel whose transmissivity is to be increased during display of black are formed larger in area or thicker in film thickness than the rest. Here, the light leakage region 45 is generated where there are alignment changes to the liquid crystal molecules caused by the corresponding alignment control protrusions 40a to 44b. From the light leakage region 45, light beams leak during display of black. As such, if the alignment control protrusions 40a to 44b are changed in area and film thickness on a color pixel basis, the transmissivity during display of black accordingly varies according to color. In this case, the specific alignment control protrusions that are larger in area or the thicker in film thickness have a larger light leakage region 45. As a result, the chromaticity difference between the displayed white and black can be reduced.

For example, when blackness shows a bias toward blue, as shown in FIGS. 5A and 5B, the alignment control protrusions 40a and 40b in the region for the red pixel 10 are formed larger in area and thicker in film thickness than the rest, i.e., the alignment control protrusions 42a, 42b and 44a, 44b in the regions for the green and blue pixels 12 and 14. Thereby, the liquid crystal molecules (not shown) of the red pixel 10 are subjected to a greater degree of alignment change, the transmissivity of the red pixel 10 is increased during display of black, and blackness that was biased toward blue shifts toward red. As such, chromaticity of displayed black can be brought closer to that of displayed white. In an alternate manner, depending on the color-tint level contained in the blackness, the alignment control protrusions may be changed in shape only for one color pixel, or the alignment control protrusions may be changed in area and film thickness for two or all of the color pixel regions.

As such, in the present embodiment, the transmissivity during display of black can be controlled on a color pixel basis by changing the area and film thickness of the alignment control protrusions 40a to 44b on an individual color pixel basis, or only for one specific color pixel. With such a structure, the color level difference between whiteness and blackness can be reduced to an extreme level. What is more, influence on whiteness can be extremely slight, and thus whiteness of any desired level can be retained. Accordingly, the liquid crystal 1 can be favorably improved in display quality.

Fourth Embodiment

Figure 6:
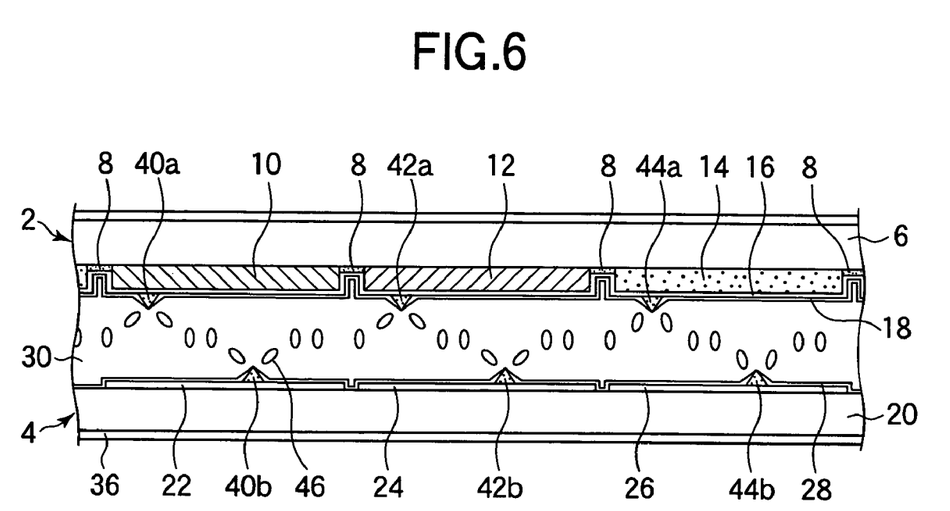
FIG. 6 is a diagram showing the schematic structure of the color pixels (red pixel 10, green pixel 12 and blue pixel 14) in the liquid crystal display 1 of the third embodiment.

By referring to FIG. 6, a liquid crystal display according to a fourth embodiment of the present invention is described. The present embodiment is characterized in that a control factor for reducing the color level difference between whiteness and blackness is the polymer structure provided in the liquid crystal layer 30 for controlling the pretilt angle of the liquid crystal molecules. FIG. 6 shows the schematic structural cross section of color pixels (red pixel 10, green pixel 12 and blue pixel 14) in the liquid crystal display 1 of the present embodiment. Herein, any component identical in operation and function as that of the liquid crystal display 1 of FIG. 1 of the first embodiment is provided with the same reference numeral, and not described again.

As shown in FIG. 6, the CF substrate 2 and the array substrate 4 are affixed together via a spacer (not shown) having a height of 4 μm. There is a gap (cell gap) between the CF substrate 2 and the array substrate 4, and therein is formed the liquid crystal layer 30 including the liquid crystal compound. This liquid crystal compound is the one derived by mixing 0.3 wt % of an acrylic photopolymeric material (manufactured by MERCK JAPAN LTD.) with nematic liquid crystal characteristics to the negative-type liquid crystal (manufactured by MERCK JAPAN LTD.). The liquid crystal layer 30 is exposed to ultraviolet radiation (UV) as voltage is applied, which polymerizes the monomers. In this manner, the polymer structure is formed in the liquid crystal layer 30. At the time of voltage application for forming the polymer structure, applying the same level of voltage to the red, green and blue pixels 10, 12 and 14 will equalize the pretilt angle of liquid crystal molecules 46 for all of those color pixels. This means that applying different levels of voltage to the color pixels will vary the pretilt angle on a color pixel basis.

Thus, the transmissivity during display of black can be controlled on a color pixel basis by varying the applying voltage level so that the pretilt angle varies for individual color pixels in a way that eliminates a color tint bias of blackness with respect to whiteness. For example, when blackness shows a bias toward blue, the red, green and blue pixels 10, 12 and 14 are all exposed to ultraviolet radiation with voltage application of 7V to the blue pixel 14, and 9V to the red and green pixels 10 and 12 for monomer polymerization. In this manner, the polymer structure is formed. As a result, where the pretilt angle is measured against the line normal to the substrate, the pretilt angles of the red and green pixels 10 and 12 become larger than that of the blue pixel 14. In this manner, the transmissivity of the red and green pixels 10 and 12 is increased during display of black, and blackness accordingly shifts toward yellow, bringing chromaticity of displayed blacken closer to that of displayed white.

As such, in the present embodiment, the transmissivity during display of black can be controlled on a color pixel basis by changing the pretilt angle of the liquid crystal molecules 46 for every color pixel. In this manner, the chromaticity difference between displayed white and black can be reduced greatly. What is more, influence on whiteness can be extremely reduced, and thus whiteness shows almost no change. Thus, the liquid crystal display 1 can be improved in display quality.

Fifth Embodiment

Described next is a liquid crystal display according to a fifth embodiment of the present invention. The present embodiment is characterized in that a control factor for reducing the chromaticity difference between displayed white and black is a gray scale voltage applied to the red, green and blue pixels 10, 12 and 14. In the liquid crystal display provided with a liquid crystal of a vertical-aligning type having negative dielectric anisotropy, display is black if the gray scale voltages applied at the common electrode 16 and the pixel electrode on the CF substrate 2 is at the same potential (no application of voltage). It means that varying the gray scale voltage during display of black on a color pixel basis depending on the color-tint level of blackness leads to a transmissivity which is different according to the color pixel, and thus successfully adjusting blackness.

When blackness shows a bias toward blue, for example, the gray scale voltage for the blue pixel is set to 1.0 V during display of black, and the gray scale voltage for the red and green pixels is set to 1.2 V. This accordingly increases the transmissivity of the red and green pixels compared with that of the blue pixel during display of black. Thus, blackness shifts toward yellow, and is brought closer in level to whiteness.

As such, in the present embodiment, the transmissivity during display of black can be controlled on an individual color pixel basis by varying the gray scale voltage for every color pixel. Thereby, the color level difference between chromaticity of displayed white and black can be reduced greatly. What is more, the influence on whiteness can be extremely slight, and thus whiteness of any desired level can be retained. Accordingly, the liquid crystal display can be favorably improved in display quality.

The present invention is not restrictive to the above embodiments, and various modifications are available.

In the second embodiment, the resin protrusion 36 is formed on the side of the CF substrate 2. The invention is not restricted to this, and alternatively, the resin protrusion 36 may be formed on the side of the array substrate 4. The resin protrusion 36 may also be changed in placement position, placement number, or formation area depending on the amount of desired shift in blackness. Moreover, the resin protrusion 36 may be formed not only on one color pixel but also two or three color pixels to derive the same effects.

In the third embodiment, the alignment control protrusions 40a to 44b are formed on both the CF substrate 2 and the array substrate 4. The invention is not restricted to this, and the alignment control protrusions 40a to 44b may be formed to either the CF substrate 2 or the array substrate 4. Moreover, the alignment control protrusions 40a to 44b may be changed in placement position, formation area (width) and thickness (height) depending on the desired amount of shift of blackness to derive the same effects.

In the fourth embodiment, the liquid crystal layer 30 is given voltage and exposed to UV radiation to change the pretilt angle of the liquid crystal molecules 46 on a color pixel basis. The invention is not restricted to this, and the pretilt angle of the liquid crystal molecules 46 may be changed for every color pixel by mask-rubbing using a photoresist, or a bilayer alignment film that is derived by laminating two alignment films having different pretilt angles. With such a structure, the same effects can be derived.

As an alternate method, blackness may be changed through combination of the above first to fifth embodiments. If this is the case, the same effects can be also achieved.

What is claimed is:

1. A liquid crystal display, comprising:
a plurality of color pixels formed on a substrate;
an opposite substrate placed facing the substrate;
liquid crystal sealed between the substrate and the opposite substrate; and
a control factor for reducing the chromaticity difference between displayed white and displayed black by changing a transmissivity on an individual color pixel basis,
wherein the control factor is a color resist that has a different color for each color pixel,
wherein the color resist formed in at least one of the color pixels has a material contrast value different from that of the color resists formed in the rest of the color pixels,
wherein a ratio of a maximum value to a minimum value of the material contrast values is higher than 1.8.

2. A liquid crystal display according to claim 1, wherein the liquid crystal has a negative dielectric anisotropy, and shows vertically aligned when no voltage is applied.

3. A liquid crystal display according to claim 1, wherein the absolute value of the chromaticity difference is 0.01 or smaller in the x-y chromaticity coordinates.

4. A liquid crystal display according to claim 1, wherein the transmissivity is a transmissivity during the display of black.

5. A liquid crystal display according to claim 1, wherein the control factor changes the chromaticity of displayed black while maintaining the chromaticity of displayed white.

6. A liquid crystal display according to claim 1, wherein the material contrast value is determined by pigment concentration of the color resist.

7. A liquid crystal display according to claim 1, wherein the control factor is a protrusion formed on either one of two substrates facing each other, or both.

8. A liquid crystal display according to claim 7, wherein the protrusion is a spacer for retaining a cell gap between substrates facing each other.

9. A liquid crystal display according to claim 7, wherein the protrusion is an alignment control protrusion for changing alignment of a liquid crystal molecules of the liquid crystal.

10. A liquid crystal display according to claim 7, wherein the protrusion has a different shape for each of the color pixels.

11. A liquid crystal display according to claim 7, wherein the protrusion has a different placement position in the color pixel for each of the color pixels.

12. A liquid crystal display according to claim 1, wherein the control factor is a polymer structure provided in the liquid crystal layer so that the pretilt angle of the liquid crystal molecules during the display of black is changed separately in each of the color pixels.

13. A liquid crystal display according to claim 1, wherein the control factor is a gray scale voltage varying for each of the color pixels during the display of black.

* * * * *